United States Patent Office 3,851,077
Patented Nov. 26, 1974

3,851,077
METHOD FOR PRESERVING FRESHLY
SLAUGHTERED MEAT
Mathias Stemmler and Heinz Stemmler, both of Konrod Adenauer Ufer 35, Cologne, Germany
No Drawing. Filed Aug. 18, 1972, Ser. No. 281,928
Claims priority, application Germany, Apr. 27, 1972, P 22 20 685.5
Int. Cl. A23b 1/00
U.S. Cl. 426—265       3 Claims

ABSTRACT OF THE DISCLOSURE

An improved process is provided for preserving fresh meat, e.g. beef or pork. The meat is contacted with an edible acetylated monoglyceride of a fatty acid (as defined). Such contact may be conveniently made by spraying or by immersion. The resulting meat resists discoloration, taste change, and weight loss upon the passage of time.

BACKGROUND OF THE INVENTION

After livestock has been slaughtered, the fresh meat obtained therefrom can be kept for only a relatively brief period of time without discoloration becoming apparent even if maintained under refrigeration, e.g. at 2 to 4° C. For instance, a color change to a reddish-black color is commonly observed after six to eight days. Accordingly, if the customer's wishes with respect to meat color are to be satisfied, discolored portions of the meat must be cut away and discarded. A further meat weight loss during storage of about one percent per day as the result of juices issuing from the meat is also commonly observed. The taste of fresh meat can be further impaired as fatty surface portions thereof undergo oxidation during storage.

It is an object of the invention to provide an improved method for preserving fresh meat.

It is an object of the invention to provide an improved process for preserving fresh meat which is capable of rendering the meat substantially resistant to discoloration.

It is an object of the invention to provide an improved method for preserving fresh meat which is capable of rendering the meat substantially resistant to taste change.

It is further object of the invention to provide an improved method for rendering fresh meat more resistant to weight loss upon the passage of time.

These and other objects, as well as the scope, nature, and utilization of the claimed method will be apparent from the following detailed description and appended claims.

SUMMARY OF THE INVENTION

It has been found that a method for preserving fresh meat comprises contacting them eat with an edible acetylated monoglyceride of a fatty acid of the formula:

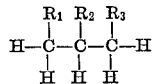

wherein either $R_1$ and $R_2$ is an esterified fatty acid having 12 and 22 carbon atoms; and the other $R_1$ or $R_2$, and $R_3$ are (1)

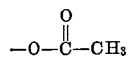

groups, or (2) one a

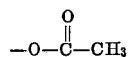

group and the other a —OH group.

DETAILED DESCRIPTION OF THE INVENTION

The meat which undergoes preservation by the method of the present invention is preferably freshly slaughtered. In a particularly preferred embodiment of the method the meat undergoes treatment not later than about three days following slaughter.

The preservation technique of the present invention is suitable for use with any type of fresh meat commonly utilized as food. In particularly preferred embodiments of the method the meat is either fresh beef or fresh pork.

The fresh meat is contacted with an edible acetylated monoglyceride of a fatty acid of the formula:

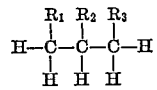

wherein either $R_1$ or $R_2$ is an esterified fatty acid having 12 to 22 carbon atoms and the other $R_1$ or $R_2$, and $R_3$ are (1)

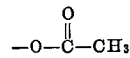

groups, or (2) one a

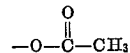

group and the other a —OH group. In a preferred embodiment of the method $R_1$ or $R_2$ is an esterified fatty acid having 16 to 18 carbon atoms. Also, in a preferred embodiment of the method the fresh meat is contacted with an edible fully acetylated monoglyceride of the formula:

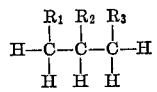

wherein either, $R_1$ or $R_2$ is an esterified fatty acid having 12 to 22 carbon atoms; and the other $R_1$ or $R_2$, and $R_3$ are

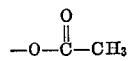

groups.

The edible acetylated monoglycerides referred to above are commonly distilled to improve purity, and are commercially available. As is known to those skilled in the art, these compounds may be formed (1) by interesterification of edible fats with glycerol triacetate (triacetin) in the presence of standard catalysts followed by molecular distillation or by steam stripping; or (2) by direct acetylation of edible monoglycerides with acetic anhydride without the use of catalysts or molecular distillation, and with acetic acid, acetic anhydride, and triacetin being removed by vacuum distillation, if required.

In the formation of the acetylated monoglycerides referred to above edible monoglycerides derived from natural fats and oils may be acetylated. The fatty acid portion of such monoglyceride may be a saturated or an unsaturated acid and commonly contains 12 to 22 carbon atoms, and preferably 16 to 18 carbon atoms. The preferred natural fat is lard. Representative vegetable oils from which the monoglycerides may be obtained include cottonseed oil, flaxseed oil, peanut oil, etc. Representative monoglycerides which may be acetylatde to form the compounds utilized in the present method are glycerol monostearate and giycerol monolaurate. Commonly, commercially available mixtures of edible acetylated monoglycerides (as defined) are selected which are liquid in form.

The properties of repersentative commercially available edible acetylated monoglycerides suitable for use in the present method are identified below.

A previously distilled, fully acetylated monoglyceride mixture obtained from a prime lard, exhibits the following properties:

Physical Characteristics

| | |
|---|---|
| Appearance | Clear, almost colorless, liquid. |
| Congeal Point | About 8° C. |
| Refractive Index | 1.447 (40° C.)/1.443 (50° C.). |
| Viscosity | 50 cps. at 20° C.; 19 cps. at 50° C. |
| Specific Gravity | 0.99 at 20° C.; 0.96 at 50° C. |

Chemical Characteristics

| | |
|---|---|
| Iodine Value | 42. |
| Saponification Value | 380. |
| Percent Monoglyceride | 0–2. |
| Reichert-Meissel Value | 145. |
| Acid Value | Less than 4. |
| Peroxide Value | Less than 2. |

A previously distilled, fully acetylated monoglyceride mixture obtained from partially hydrated vegetable oil, exhibits the following properties:

Physical Characteristics

| | |
|---|---|
| Appearance | Clear, almost colorless liquid. |
| Congeal Point | About 7° C. |
| Refractive Index | 1.447 (40° C.). |
| Viscosity | 56 cps. at 20° C.; 19 cps. at 50° C. |
| Specific Gravity | 0.98 at 20° C.; 0.96 at 50° C. |

Chemical Characteristics

| | |
|---|---|
| Iodine Value | 44 |
| Saponification Value | 380 |
| Percent Monoglyceride | 0–2 |
| Reichert-Meissel Value | 146 |
| Acid Value | Less than 4 |

A previously distilled, fully acetylated monoglyceride mixture obtained from cottonseed oil exhibits the following properties:

Physical Characteristics

| | |
|---|---|
| Appearance | Clear, very slightly yellow-colored liquid. |
| Congeal Point | About 1° C. |
| Refractive Index | 1.451 (40° C.). |
| Viscosity | 47 cps. at 20° C.; 18 cps. at 50° C. |
| Specific Gravity | 0.98 at 20° C.; 0.96 at 50° C. |

Chemical Characteristics

| | |
|---|---|
| Iodine Value | 70 |
| Saponification Value | 380 |
| Percent Monoglyceride | 0–2 |
| Reichert-Meissel Value | 145 |
| Acid Value | Less than 4 |

The fresh meat may be contacted by the edible acetylated monoglycerides in any convenient manner. Preferred contact techniques involve spraying or immersion. The acetylated monoglycerides may be applied while in a substantially pure form or while dissolved in edible solvents for the same, e.g. water, vegetable oils, mineral oils, etc. The acetylated monoglycerides are preferably maintained at about 1 to 16° C. when contacted with the fresh meat, and most preferably at a temperature of about 1 to 4° C. When spraying or dipping is utilized a uniform film of the acetylated monoglyceride is provided upon the surface of the fresh meat. In a particularly preferred embodiment of the method the acetylated monoglyceride is applied via spraying or immersion to form a coating upon the surface of the meat in a quantity of about 0.1 to 0.5 percent by weight based upon the weight of the meat. Alternatively, the fresh meat may be stored while completely immersed in the acetylated monoglyceride while simultaneously maintained under refrigeration (e.g. for as long as 21 to 30 days, or more). Suitable containers for the meat while undergoing immersion include those of stainless steel and porcelain. During such treatment the fresh meat is completely covered by the acetylated monoglyceride, preferably to an extent of at least about 5 cm. above the meat.

The following Examples are given as specific illustrations of the invention. It should be understood, however, that the invention is not limited to the specific details set forth in the Examples.

Front and hind quarter portions of beef (i.e. shoulder and shank portions) and hind quarter portions of pork were removed from the bone, and each of these cuts of meat was divided into three equal pieces and was treated in the following manner on the third day following slaughter.

Group I: One piece of each cut of the beef and pork was simply stored in a cold-storage chamber provided at a temperature of from 2 to 3° C.

Group II: One piece of each cut of the beef and pork was immersed in the distilled fully acetylated monoglyceride obtained from prime lard (described above) until the cuts of meat were fully covered by the acetylated monoglyceride. The pieces of meat were then removed, the excess acetylated monoglyceride was allowed to drain therefrom for two to three minutes, and resulting coated pieces of meat were next stored for twenty-five days in the same cold-storage chamber as the control pieces of beef and pork of Group I.

Group III: One piece of each cut of the beef and pork was suspended in a high-grade steel container filled with the distilled fully acetylated monoglyceride obtained from prime lard (described above), with each piece of meat being fully covered by the acetylated monoglyceride. The container was then closed and stored for twenty-five days while under refrigeration at a temperature of 16° C.

An examination of the pieces of meat, treated in the above-identified manner revealed the following results:

Group I: The pieces of beef and pork had assumed a reddish-black color after fourteen days, and were therefor inedible.

Group II: There was virtually no change in the color of the fresh meat, and the quality of the meat was unimpaired.

Group III: The condition of the meat was substantially the same as that of fresh meat. The beef had the same bright red color as has freshly slaughtered meat, and the pork had the same light color as freshly slaughtered pork.

When the weights of the pieces of meat were checked, it was found that the beef of Group I had lost 9% more weight than the beef of Group II, and that the pork of Group I had lost 6% more weight than the pork of Group II. The beef and pork of Group III experienced no weight loss following the commencement of the treatment.

Pieces of beef and pork from Group III were weighed and boiled in water while present in a high-grade steel vessel without salt and seasoning. Additionally, unsalted and unseasoned beef and pork steaks treated in accordance with the present invention were roasted in neutral vegetable fat in a high-grade steel pan. The roasted and boiled meat was substantially as tender and as palatable as freshly slaughtered meat. All the persons who tasted these sample came to the conclusion that the boiled and roasted pieces of treated meat were no different from boiled and roasted pieces of fresh meat. In order to carry out the taste tests accurately, the mouth of each person taking part in the tests was rinsed with warm water after each sample in order to neutralize the taste buds. Substantially identical test results were obtained when beef and pork samples were treated utilizing the fully acetylated monoglycerides obtained from partially hydrated vegetable oil and from cottonseed oil (described above).

The preservation method of the present invention effectively and simply overcomes difficulties commonly encountered during the storage of fresh meat. For instance, a three fold increase in permissible storage time is made possible thereby greatly simplifying inventory control for large quantities of fresh meat undergoing storage. Also, the fresh meat treated in accordance with the present method exhibits no substantial reduction in quality during such storage, i.e., no substantial juice loss, change in color, taste, odor, structure, or weight. Increased tenderness is also exhibited by fresh meat treated in accordance with the present invention.

Although the invention has been described with preferred embodiments, it is to be understood that variations and modifications may be resorted to as will be apparent to those skilled in the art. Such variations are to be considered within the perview and scope of the claims appended hereto.

We claim:

1. An improved method for preserving freshly slaughtered meat consisting of applying to said meat as an edible coating a di- or triglyceride of a fatty acid of the formula

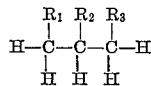

wherein either $R_1$ or $R_2$ is an esterified fatty acid having 12 to 22 carbon atoms; and the other $R_1$ or $R_2$, and $R_3$ are

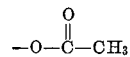

groups, said edible acetylated monoglycedire being maintained at about 1 to 160 C. when in contact with said meat.

2. An improved method according to Claim 1 wherein said glycedire of said fatty acid is derived from a member selected from the group consisting of lard, cottonseed oil and partially hydrated vegetable oil.

3. An improved method according to Claim 1 wherein said edible glyceride is maintained at about 1 to 4° C. when in contact with said meat.

References Cited

UNITED STATES PATENTS

| | | | |
|---|---|---|---|
| 3,000,748 | 9/1961 | Clark | 99—166 |
| 2,982,660 | 5/1961 | Brissey et al. | 99—169 |
| 3,667,970 | 6/1972 | Scheide | 99—169 |
| 3,192,057 | 6/1965 | Hines et al. | 99—169 |
| 3,158,488 | 11/1964 | Firth | 99—169 |
| 3,471,304 | 10/1969 | Hamdy et al. | 99—169 |
| 3,388,085 | 6/1968 | Levkoff et al. | 99—169 |

HYMAN LORD, Primary Examiner

S. DAVIS, Assistant Examiner

U.S. Cl. X.R.

426—302, 307, 310

UNITED STATES PATENT OFFICE
CERTIFICATE OF CORRECTION

Patent No. 3,851,077      Dated November 26, 1974

Inventor(s) Mathias Stemmler and Heinz Stemmler

It is certified that error appears in the above-identified patent and that said Letters Patent are hereby corrected as shown below:

Col. 1, line 56, cancel "them eat" and substitute -- the meat --

Col. 1, line 63, change "12 and 22" to -- 12 to 22 --.

Col. 2, line 67, correct spelling of "acetylated".

Col. 4, line 59, change "ofthe" to -- of the --.

Col. 6, line 5 (claim 1), correct spelling of "monoglyceride";

Col. 6, line 6 (claim 1), cancel "160C" and substitute -- 16°C.--.

Col. 6, line 9 (claim 2), correct spelling of "glyceride".

Signed and sealed this 11th day of February 1975.

(SEAL)
Attest:

RUTH C. MASON
Attesting Officer

C. MARSHALL DANN
Commissioner of Patents
and Trademarks